United States Patent [19]

Gris et al.

[11] Patent Number: 5,343,158
[45] Date of Patent: Aug. 30, 1994

[54] AMPLIFIER DEVICE FOR A CABLE TELEVISION DISTRIBUTION NETWORK

[75] Inventors: Joël Gris, Louviers; François Charpail, Paris, both of

[73] Assignee: U.S. Philips Corporation, New York, N.Y.

[21] Appl. No.: 933,286

[22] Filed: Aug. 21, 1992

[30] Foreign Application Priority Data

Aug. 28, 1991 [FR] France ................... 91 10671

[51] Int. Cl.$^5$ ................. H04N 1/00; H04N 7/10; H04H 1/06
[52] U.S. Cl. .................... 328/103; 328/167; 455/3.3; 455/5.1; 348/6
[58] Field of Search ............ 328/103, 167; 455/3.3, 455/5.1; 358/86

[56] References Cited

U.S. PATENT DOCUMENTS

| | | | |
|---|---|---|---|
| 1,743,691 | 6/1925 | Shea . | |
| 2,974,188 | 3/1961 | Diambra | 455/5.1 |
| 3,806,813 | 4/1974 | Eller | 455/5.1 |
| 4,077,006 | 2/1978 | Nicholson | 455/5.1 |
| 4,982,440 | 1/1991 | Dufresne et al. | 455/5.1 |

*Primary Examiner*—John Zazworsky
*Attorney, Agent, or Firm*—Robert J. Kraus

[57] ABSTRACT

The device comprises a first path provided with an amplifier (1) amplifying in a first frequency band, and a second path provided with an amplifier (2) amplifying in a direction opposite to that of the first amplifier and in a second frequency band other than the first frequency band, a first filter element (L1) having a low pass characteristic for transmitting the signals of the first path, and a second filter element (C1) having a high pass characteristic for transmitting the signals of the second path. The two paths are combined by a third filter element (CA) having a high pass characteristic, arranged in series with a fourth filter element (LA) having a low pass characteristic, whose junction point is connected to ground by a matched impedance (ZCA), and a signal polarity inverting element (TA) is inserted in series between two of the filter elements.

7 Claims, 2 Drawing Sheets

AMPLIFIER DEVICE FOR A CABLE TELEVISION DISTRIBUTION NETWORK

BACKGROUND OF THE INVENTION

The present invention relates to an amplifier device intended for incorporation in a cable of a cable television distribution network, comprising two parallel paths each having their ends interconnected for forming an input/output terminal, the first path being provided with an amplifier operating in a first frequency band, the second path being provided with an amplifier operating in a direction opposite to that of the first amplifier and in a second frequency band other than the first band, having taken in a direction from each terminal a first filter element having a characteristic of a first type for filtering the signals of the first path and a second filter element having a characteristic of a second type complementary to the first type for filtering the signals of the second path.

Devices of such a type are inter alia used in known cable television distribution systems such as "MATV" or "CATV", depending on whether the distribution is inside a building or for a town.

In such a device, the amplifiers are loopwise connected to each other and the resultant feedback will cause the assembly to oscillate if adequate precautions are not taken; the presence of filter elements which transfer passbands to each amplifier independently of each other render it possible to prevent the oscillation. This is commonly called loop isolation. In any case these filter elements must have very pronounced characteristics, since the attenuation of the filter elements must always exceed, at a given frequency, the gains of the amplifiers at this frequency, which implies that these elements are expensive. In addition, even when the attenuation is sufficient, the impedance matching is often poor outside the useful passbands of each amplifier, and this may be sufficient to cause oscillations, since certain amplifiers oscillate when they are poorly matched.

U.S. Pat. No. 1,743,691 describes the insertion of a blocking filter circuit having a resonant frequency situated as an interruption between the said passbands. This arrangement increases the filter performance, but the basic principle nevertheless remains the same, with conventional filters which must have high performances.

SUMMARY OF THE INVENTION

It is an object of the invention to provide an amplifier device which because it is of a simple structure is of a low price, and which nevertheless has a very strong loop separation and a proper matching everywhere in the system and at all frequencies, even outside the passbands.

It is based on the idea of inserting elements which add components cancelling the feedback, instead of trying to improve the filter performances.

To this effect, an amplifier device according to the invention, is characterized in that the two paths are coupled to each other by means of an assembly composed of the series arrangement of elements and comprising, considered from the first path, a third filter element having a characteristic of the second type and a fourth filter element having a characteristic of the first type and in that the junction point of the third and fourth filter elements is connected to ground via a matched load, that is to say in principle a resistance equal to the characteristic impedance of the cable, and in that a signal polarity inverting element is arranged in series between the two filter elements.

The objects of the invention are also achieved, in a variant of the embodiment, by the fact that the two paths are coupled to each other by an assembly composed of the series arrangement of elements and comprising, taken in the direction from the first path, a third filter element having a characteristic of the second type, and a fourth filter element having a characteristic of the first type, that the junction point of the third and fourth filter element is connected to ground via a matched load, that is to say in principle a resistance equal to the characteristic impedance of the cable, and that a magnetic coupling is provided between the first and the fourth filter element.

In these two variants, the first and fourth elements on the one hand, and the second and third elements on the other hand, are advantageously equal to each other.

In a further variant of the embodiment using which it is still possible to achieve the objects of the invention, the device is characterized in that it includes a transformer having a winding arranged in parallel with one of the filter elements transmitting the signals of one of the paths, and a further winding one end of which is connected to ground via a matched load, that is to say in principle a resistance equal to the characteristic impedance of the cable, and whose other end is connected to the other one of the paths.

The filter elements may be of a greater or less great complexity depending on the selectivity desired. The loop separation is yet sufficient when filter elements having a characteristic of the first type are simple inductances, and/or filter elements having a characteristic of the second type are simple capacitors. The quotient of the value of an inductance divided by the value of the capacitance is then advantageously equal to the square of the characteristic impedance value of the cable.

The signal polarity inverting element is advantageously a transformer, which is advantageously wound on a ferrite core.

BRIEF DESCRIPTION OF THE DRAWING

The following description, which is given by way of non-limitative example with reference to the accompanying drawing figures, will make it better understood how the invention may be put into effect.

DESCRIPTION OF THE PREFERRED EMBODIMENTS

Figure 1:
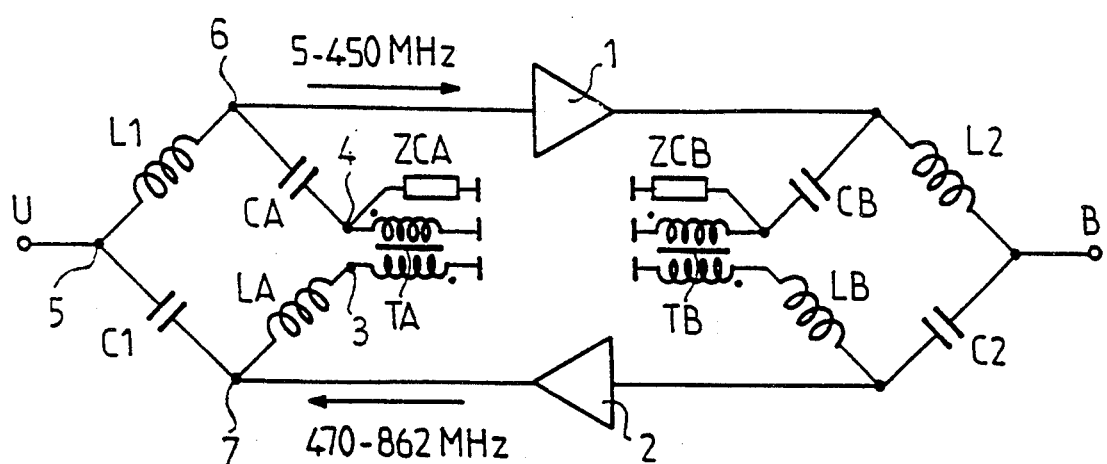
FIG. 1 is a circuit diagram of a first embodiment of the invention.

In FIG. 1 an amplifier device for a cable television distribution network comprises a first path extending from an input U to an input B via an amplifier 1 which in a first frequency band amplifies "ascending" signals transmitted by users located downstream of the input U, and a second path extending from the input B to the input U via an amplifier 2 which, in a direction opposite to that of the first amplifier 1 and in a second frequency band, amplifies "descending" signals transmitted to users via a central exchange located upstream of the input B of the device. The ascending signals transmitted over the path 1 occupy, for example, the frequency band 5–450 MHz and the descending signals transmitted over the path 2 occupy the frequency band 470–862 MHz.

A first filter element having a characteristic of a first type, here of the low pass type, constituted by a simple inductance L1, is connected to the input U for transmitting the input signals U to the amplifier 1 over the first path, and a second filter element having a characteristic of a second type complementary to the first, here of the high pass type, constituted by a simple capacitance C1, is connected to this same input U for transmitting the signals outputted by the amplifier 2 of the second path.

The device of FIG. 1 furthermore includes a second assembly of identical elements, arranged in a symmetrical manner at the side of the input B on the right in the circuit diagram, with a simple capacitance C2 connected to the input B for transmitting the input signals B to the amplifier 2 of the second path, and a simple inductance L2 connected to that same input B for transmitting signals outputted by the amplifier 1 of the first path.

It will be obvious that as the output of the amplifier 1 is fed back to the input of the amplifier 2 via L2 and C2, and similarly the output of the amplifier 2 is fed back to the input of the amplifier 1 via C1 and L1, there is a great risk of spontaneous oscillations being produced. To avoid these oscillations, a very efficient filtering operation must be provided which, in the present example, allows only the frequencies lower than 450 MHz to flow to the amplifier 1, and only the frequencies higher than 470 MHz to flow to the amplifier 2, and whose attenuation outside these ranges is higher than the gain of the amplifiers. It will be clear that if in addition one wants to have a high gain, the filters will of necessity be expensive, and their price will be the higher according as the limits of the frequency bands are closer to each other.

In accordance with the invention a third filter element is provided having a characteristic of the second type, i.e. of a high pass type, constituted by a simple capacitance CA connected to the first path, in series with a fourth filter element having a characteristic of the second type, i.e. of a low pass type, constituted by a simple inductance LA connected to the second path, the junction point of the third and fourth filter elements, in which a transformer TA is inserted which inverses the polarity of the signals, is connected to ground via a matched load ZCA, more specifically a resistance equal to the characteristic impedance of the cable. This load here leads to the side of CA (point 4), but it might likewise lead to the side of LA (point 3). The transformer is inserted in series between the inductance LA and the capacitance CA, that is to say between two of the filter elements. With the sense in which the transformer windings are wound, indicated in customary manner by two dots in the Figure, this transformer inverses the signals present in point 3 to apply them to point 4, or vice versa. The various elements are given separate references to enable their individual identification in the Figures, but in actual practice the inductances L1 and LA are equal, and similarly the capacitances C1 and CA are equal. In addition, to obtain a proper impedance match, it is preferable for the quotient of the value of an inductance divided by the value of a capacitance to be equal to the square of the value of the characteristic impedance of the cable: L1/C1 or L1/CA or LA/CA or LA/C1 is equal to $ZCA^2$, but of course allowing for tolerances.

Identical elements are preferably connected in the same manner to the side of the input B, the elements CB, LB, TB, ZCB corresponding to the respective elements CA, LA, TA, ZCA described in the foregoing.

The mode of operation of this assembly can be explained as follows: a signal at the input U arrives at point 4 via L1 and CA, but also at the point 3 via C1 and LA. When this assembly is balanced, i.e. CA=C1 and LA=L1, the signal at 3 is then equal to the signal at 4, and after inversion by the transformer TA, it is accurately opposite thereto and the two signals are cancelled out on the load ZCA. The input U consequently does not "see" this load. The same reasoning holds from the point 7 onwards: the output signal of the amplifier 2, applied to point 7, arrives at the point 6 via C1 and L1, but also via LA and CA. If the assembly is balanced, these two paths are equal and after inversion by the transformer TA, the two signals are exactly opposite one another and cancel each other out in 6, that is to say at the input of the amplifier 1. It will be clear that all this also holds for the path between the output of the amplifier 1 and the input of amplifier 2. Moreover, as regards the matching, from point 6, for example, it is correct for the low frequencies which flow across the inductance L1 and are loaded by the matched line connected to U, and it is also correct for the high frequencies which flow across the capacity CA and are loaded by the matched impedance ZCA. A converse reasoning can be followed from point 7 onwards. Then all the amplifiers are loaded at all frequencies by a correct impedance and the output signal of an amplifier does not reach the other amplifier.

Thus the loop separation is a function of the balance between the elements, and is independent from the slope of the attenuation of the filters. In the circuit diagram of FIG. 1, for example, the frequency filtering function has a slope of only 3 dB per octave, and nevertheless the loop separation can easily reach 50 dB.

Figure 2:
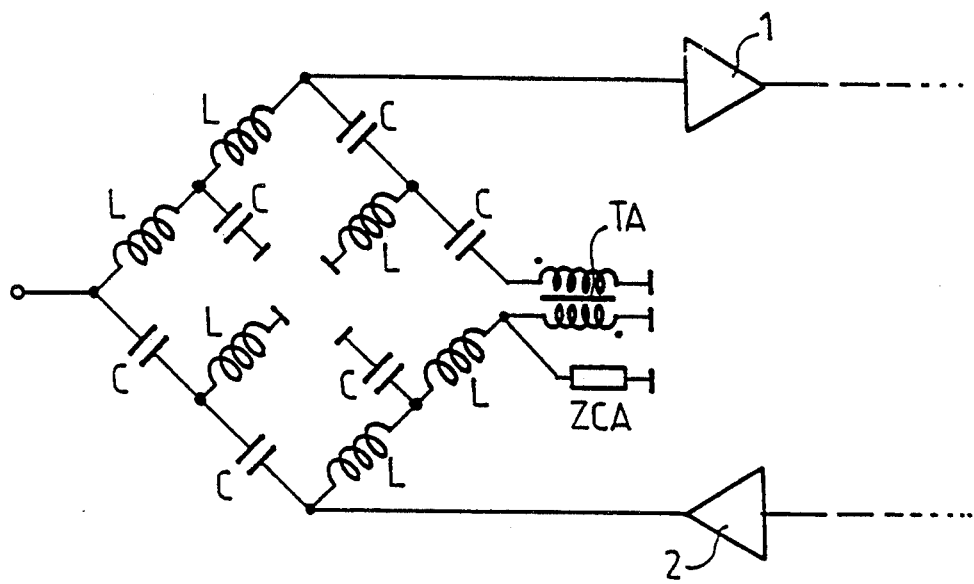
FIG. 2 is a circuit diagram of a variant of the embodiment of the circuit diagram of FIG. 1.

FIG. 2 and the following Figures illustrate the left-hand portion of the device only since the righthand portion can easily be deduced since it is symmetrical thereto. FIG. 2 shows the circuit diagram of a device in which the simple elements of FIG. 1 have been replaced by more complex elements: each capacitance (CA, CB, C1, C2 of FIG. 1) is replaced by an assembly consisting of two series-arranged capacitances C, and an inductance L between the junction point of the two capacitances and ground, and each inductance (LA, LB, L1, L2 of FIG. 1) is replaced by an assembly consisting of two series-arranged inductances L, and a capacitance C between the junction point of the two inductances and ground. The transformer TA is in the same place as in FIG. 1.

It is equally possible to use other forms of elements having complementary characteristics, for example band elimination filters as elements of one type and bandpass elements as elements of the other type (not shown).

Figure 3:
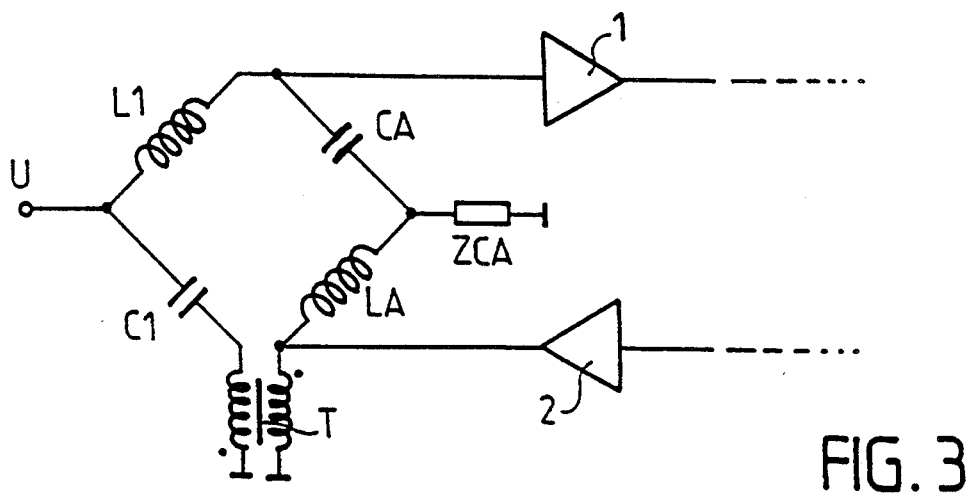
FIG. 3 is a circuit diagram of a further variant of the circuit diagram of FIG. 1.

The device represented by the circuit diagram of FIG. 3 is identical to the device shown in FIG. 1, except for the position of the transformer which is now inserted between the elements C1 and LA. The transformer TA can actually be arranged in series between any one of the filter elements: it is also possible to accommodate it between L1 and C1 or between L1 and CA, although this has not been shown to limit the number of Figures. All this applies of course also to FIG. 2.

Figure 4:
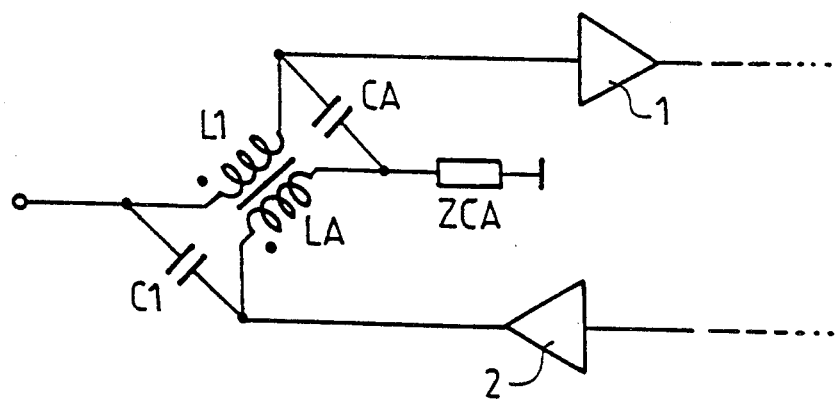
FIGS. 4 and 5 are circuit diagrams of a second and a third embodiment of the invention.

The device represented by the circuit diagram of FIG. 4 is slightly different, although its operating principle is still the same. It also includes a second capacitance CA arranged in series with a second inductance LA, whose junction point is connected to ground by the matched load ZCA, but the two inductances are magnetically coupled to each other. The transformer TA of the previous Figures is absent but the magnetic coupling between the inductances L1 and LA, which are designed as windings of a transformer with the indicated winding sense, play the same role. This assembly is nevertheless critical as the adequate coupling between the inductances may be difficult to achieve.

Figure 5:
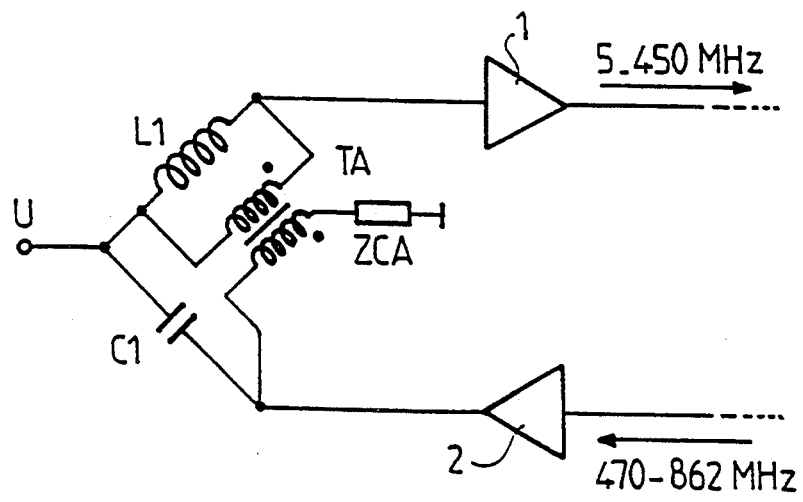

The device shown in FIG. 5 utilizes an inductance of approximately half the value and a capacitance of approximately double the value relative to the elements of the previous Figures. It has the advantage that the two capacitances CA and CB and the two inductances LA and LB of FIG. 1 may be omitted. In this assembly, a transformer has a first winding connected in parallel with the filter element L1 which transfers the signals to the amplifier 1, and a second winding a first end of which connected to ground via the matched load ZCA, and whose second end is connected to the second path. It is alternatively conceivable that the first winding is connected in parallel with the capacitance C, and that the second end of the second winding is connected to the first path.

The above circuit diagrams hold for coaxial lines, i.e. asymmetrical lines, which nowadays are almost only used in cable television distribution networks. It will no doubt be evident that if a person skilled in the art should want to use two-wire symmetrical lines he could if necessary "undouble" all these circuit diagrams to make them suitable for application to such lines.

We claim:

1. An amplifier device intended for incorporation in a cable of a cable television distribution network, comprising two parallel paths each having their ends interconnected for always forming an input/output terminal, the first path being provided with an amplifier operating in a first frequency band, the second path being provided with an amplifier operating in a direction opposite to that of the first amplifier and in a second frequency band other than the first band, having taken in a direction from each terminal a first filter element having a characteristic of a first type and a second filter element having a characteristic of a second type complementary to the first type for transmitting the signals of the second path, characterized in that the two paths are joined together by means of an assembly composed of the series arrangement of elements and comprising, considered from the first path, a third filter element having a characteristic of the second type and a fourth filter element having a characteristic of the first type and in that the junction point of the third and fourth filter elements is connected to ground via a matched load, that is to say in principle a resistance equal to the characteristic impedance of the cable, and in that a signal polarity inverting element is arranged in series between the two filter elements.

2. An amplifier device intended for incorporation in a cable of a cable television distribution network, comprising two parallel paths each having their ends interconnected for always forming an input/output terminal, the first path being provided with an amplifier operating in a first frequency band, the second path being provided with an amplifier operating in a direction opposite to that of the first amplifier and in a second frequency band other than the first band, having taken in a direction from each terminal a first filter element having a characteristic of a first type and a second filter element having a characteristic of a second type complementary to the first type for transmitting the signals of the second path, characterized in that the two paths are joined together by means of an assembly composed of the series arrangement of elements and comprising, considered from the first path, a third filter element having a characteristic of the second type and a fourth filter element having a characteristic of the first type and in that the junction point of the third and fourth filter elements is connected to ground via a matched load, that is to say in principle a resistance equal to the characteristic impedance of the cable, and in that a magnetic coupling is provided between the first and fourth filter elements.

3. An amplifier device as claimed in one of the claims 1 or 2, characterized in that the first and fourth elements on the one hand, and the second and third elements on the other hand, are equal to each other.

4. A amplifier device intended for incorporation in a cable of a cable television distribution network, comprising two parallel paths each having their ends interconnected for always forming an input/output terminal, the first path being provided with an amplifier operating in a first frequency band, the second path being provided with an amplifier operating in a direction opposite to that of the first amplifier and in a second frequency band other than the first band, having taken in a direction from each terminal a first filter element having a characteristic of a first type and a second filter element having a characteristic of a second type complementary to the first type for transmitting the signals of the second path, characterized in that it includes a transformer having a winding arranged in parallel with one of the filter elements transmitting the signals of one of the paths, and a further winding one end of which is connected to ground via a matched load, that is to say in principle a resistance equal to the characteristic impedance of the cable, and whose other end is connected to the other one of the paths.

5. An amplifier device as claimed in claim 1, 2 or 4, characterized in that the filter elements having a characteristic of the first type are simple inductances, and/or filter elements having a characteristic of the second type are simple capacitors.

6. An amplifier device as claimed in claim 5, characterized in that the quotient of the value of an inductance divided by the value of the capacitance is equal to the square of the characteristic impedance value of the cable.

7. An amplifier device as claimed in claim 1, characterized in that the signal polarity inverting device is a transformer.

* * * * *